(12) United States Patent
Nair

(10) Patent No.: US 6,271,706 B1
(45) Date of Patent: Aug. 7, 2001

(54) DIVIDED VOLTAGE DE-COUPLING STRUCTURE

(75) Inventor: Raj Nair, Hillsboro, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,631

(22) Filed: Jan. 22, 1998

(51) Int. Cl.[7] ........................................ H03K 5/08
(52) U.S. Cl. ........................ 327/314; 327/311; 327/320
(58) Field of Search ........................... 327/309, 310, 327/311, 314, 320, 321, 325, 330; 361/56, 91

(56) References Cited

U.S. PATENT DOCUMENTS

| | | | |
|---|---|---|---|
| 4,382,198 | * 5/1983 | Ishijima et al. | 327/309 |
| 4,568,871 | * 2/1986 | Bauman | 323/364 |
| 4,760,433 | * 7/1988 | Young et al. | 257/357 |
| 5,159,518 | * 10/1992 | Roy | 361/56 |
| 5,163,174 | * 11/1992 | Beeken | 330/10 |
| 5,177,378 | * 1/1993 | Nagasawa | 326/83 |
| 5,283,764 | * 2/1994 | Kim et al. | 365/222 |
| 5,485,126 | * 1/1996 | Gersbach et al. | 327/309 |
| 5,657,212 | * 8/1997 | Poon et al. | 363/17 |
| 5,705,941 | * 1/1998 | Fukazawa et al. | 326/86 |
| 5,886,558 | * 3/1999 | Iijima et al. | 327/310 |

* cited by examiner

Primary Examiner—Terry D. Cunningham
(74) Attorney, Agent, or Firm—Blakely, Sokoloff, Taylor & Zafman LLP

(57) ABSTRACT

The present invention provides an integrated circuit (I.C.) with a de-coupling circuit. The de-coupling circuit includes a voltage divider that includes first and second divider elements. The first and second divider elements are coupled to positive and negative supply voltages, respectively. The first and second divider elements are coupled therebetween at a central node. The de-coupling circuit further includes a PMOSFET transistor and a NMOSFET transistor that have their gates coupled at the node. The PMOSFET and NMOSFET transistors have their sources, drains, and bulks thereof coupled to the positive and negative supply voltages, respectively.

22 Claims, 3 Drawing Sheets

DIVIDED VOLTAGE DE-COUPLING STRUCTURE

BACKGROUND OF THE INVENTION (1) Field of the Invention

The present invention generally relates to the field of electronic circuits. More specifically, the present invention relates to de-coupling circuits.

(2) Background Information

De-coupling capacitors are known in the art. Such capacitors may be used for de-coupling high-frequency noise voltages from a load circuit that may receive current from a power source. The noise is typically caused by the load current demand as well as the current source capability of the power supply circuit.

De-coupling of higher voltages may raise particular problems in the case where it is performed on-die by way of devices designed for a low-voltage process. Higher voltages may not be directly applied to on-die devices in a low voltage process because, as the applied voltage is increased, the devices to which the voltage is applied start degrading. In the case where the on-die de-coupling device is a transistor, the respective transistor may be degraded when operated beyond a prescribed range, i.e. when a higher voltage is applied thereto. In a particular instance, the behavior of a transistor in a Complementary Metal Oxide Semiconductor (CMOS) process depends upon the electric field to which the channel of the transistor may be subjected when a certain voltage is applied at the gate of the transistor. If a device such as a transistor is designed for a 3.3 volts process, and one needs to de-couple 4.6 volts, the gate oxide of the transistor operated at 4.6 volts may degrade over time, thus changing the characteristics of the device and consequently influencing the functionality of the device.

Accordingly, it is desirable to provide a reliable on-die de-coupling circuit using devices in a low-voltage process that in combination are able to handle higher voltages. It is desirable that the higher voltages applied to such de-coupling circuits do not cause a degradation of the on-die devices. It is also desirable that the de-coupling circuit consumes very little power.

SUMMARY OF THE INVENTION

In one embodiment the present invention includes an integrated circuit (I.C.) with a de-coupling circuit. The de-coupling circuit includes a voltage divider that includes first and second divider elements. The first and second divider elements are coupled to positive and negative supply voltages, respectively. The first and second divider elements are coupled therebetween at a node. The de-coupling circuit further includes a PMOS transistor and a NMOS transistor that have their gates coupled at the node. The PMOS and NMOS transistors have their sources, drains, and bulks thereof coupled to the positive and negative supply voltages, respectively.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
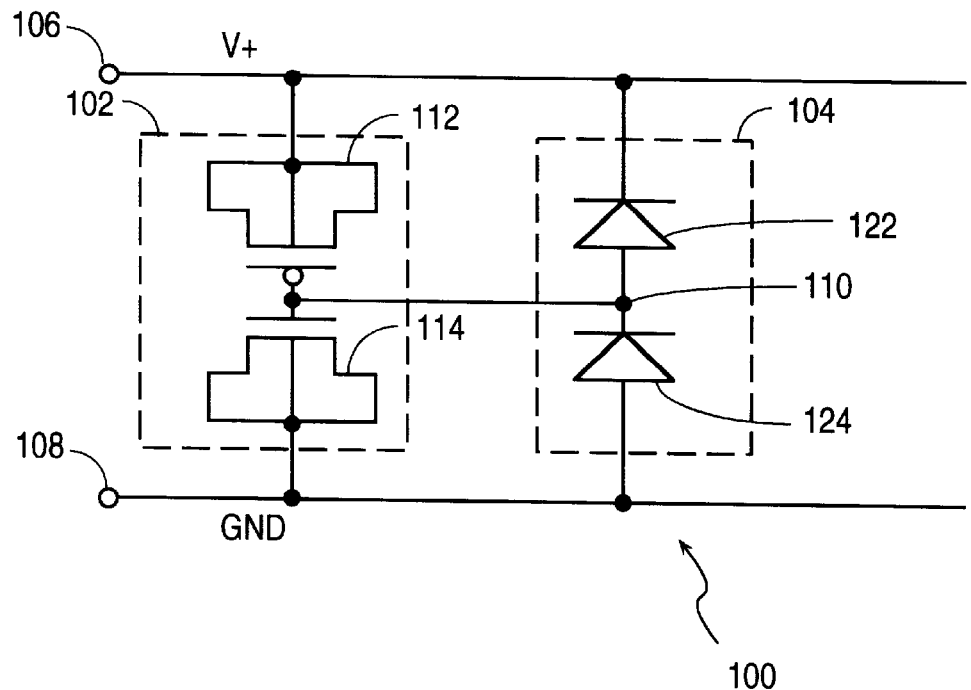
FIG. 1 illustrates one embodiment of a de-coupling circuit according to the present invention.

FIG. 1 illustrates a de-coupling circuit 100 according to the present invention. The de-coupling circuit according to the present invention includes a divided de-coupling capacitive device 102 coupled between first and second terminals 106 and 108 (hereinafter referred to as "positive terminal 106 and negative terminal 108"). These terminals may be the positive and negative terminals of a power supply. Terminal 108 may be coupled to ground.

In one embodiment according to the present invention described herein, the divided de-coupling capacitor is an on-die de-coupling capacitor that includes capacitive devices 112 and 114 used in a low-voltage process for higher voltages. Moreover, in the embodiment of the present invention described herein capacitive devices 112 and 114 are implemented by way of PMOS device 112 and channel Metal Oxide Semiconductor Field Effect Transistor (PMOSFET) device 114. PMOSFET device 112 has a source and drain thereof coupled together and to the positive terminal 106. A gate of PMOSFET device 112 is coupled to a common node 110. A gate of NMOSFET device 114 is coupled to common node 110. A source and drain of NMOSFET device 114 are commonly coupled to the negative terminal 108. Transistors 114 and 112 connected in the configuration shown in the figure make up two capacitors that are coupled therebetween in series: the first capacitor is formed by the gate, the channel and the oxide of the transistor 112; and the second capacitor is formed by the gate, the channel, and the oxide of transistor 114. The capacitors provided by transistors 112 and 114 perform optimally when transistors 112 and 114 are in full conduction.

The de-coupling circuit 110 further includes voltage divider 104. Voltage divider 104 includes first and second divider elements 122 and 124. In one embodiment according to the present invention, the voltage divider elements 122 and 124 are implemented by way of two substantially identical diodes 122 and 124 coupled in series. These diodes are coupled such that when a positive voltage is applied between terminals 106 and 108, the diodes are reversed biased. In one embodiment of the de-coupling circuit 110 according to the present invention, a reverse saturation current flowing through the diodes maintains central common node 110 at about half the voltage applied between terminals 106 and 108, thereby insuring that both capacitors formed by way of transistors 112 and 114 have applied thereon approximately half the voltage applied between terminals 106 and 108. The effective total capacitance of this configuration has a capacitance value approximately equal to half a capacitance of the gate oxide area corresponding to each transistor.

The configuration illustrated in FIG. 1 is particularly useful when the voltage applied between terminals 106 and 108 is higher than the process limitation for the voltage to be applied to a certain on-die device. For example, when the voltage to be de-coupled (voltage applied between terminals 106 and 108) is far higher than the process voltage, the voltage divider divides this voltage in half across each capacitor, and, therefore, each capacitor receives a lower voltage thereacross due to the identity of reverse-biased diodes 122 and 124. A divider that divides the voltage in two is preferable, as the voltage between terminals 106 and 108 is equally divided between the two capacitors 112 and 114. This reduces the possibility of an un-even distribution of voltages across the capacitors 112 and 114. Such un-even distribution may be harmful to the capacitor that would receive a higher voltage thereacross if such voltage is higher than the process voltage.

Note that the present invention may be implemented with metal capacitors instead of transistors 112 and 114. However, metal capacitors take a large area. Therefore transistor capacitances are preferable due to the smaller area they take up. Moreover, the voltage divider may be implemented by using two resistors of exactly the same size. Resistors, however, consume a significant amount of current, which is not desirable in low-power designs. The structures shown in FIG. 1 with the two reverse-bias diodes consume very little current because the reverse saturation current is very small. The implementation of the present invention consumes extremely low power and insures that the two capacitors are operated in safe regions.

Figure 2:
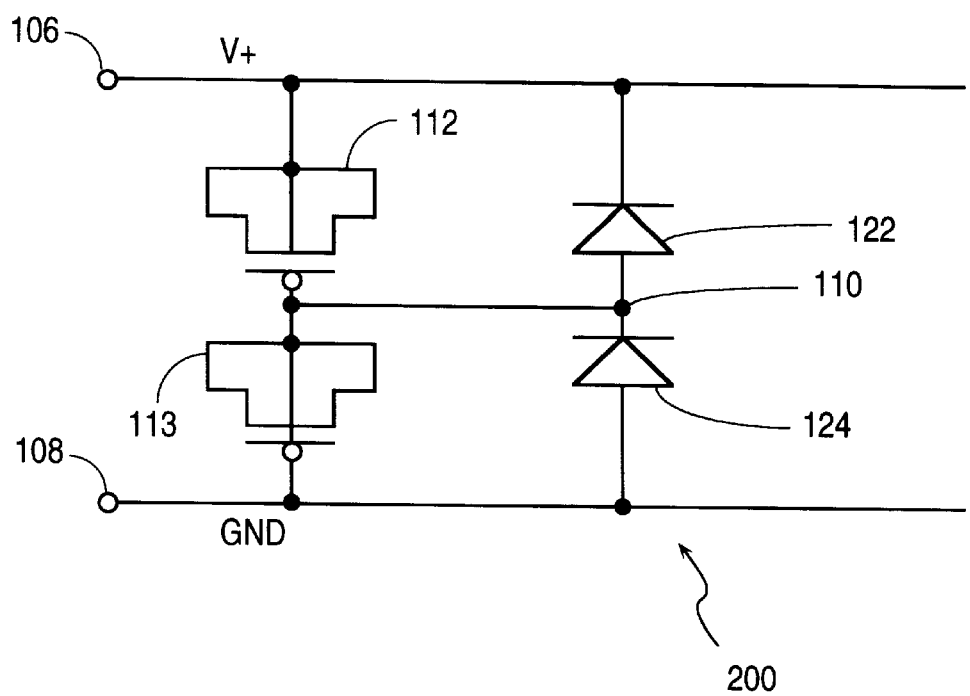
FIG. 2 illustrates an alternative embodiment of the de-coupling circuit according to the present invention.

FIG. 2 illustrates a second embodiment 200 of the present invention where both transistors 112 and 113 are PMOSFET transistors coupled in parallel with diodes 122 and 124. In this embodiment, transistor 112 is coupled just like transistor 112 of FIG. 1. PMOSFET transistor 113 has a source and drain thereof coupled to the common central node 110 whereas the gate of transistor 113 is coupled to the negative supply voltage (ground in the embodiment described herein).

Figure 3:
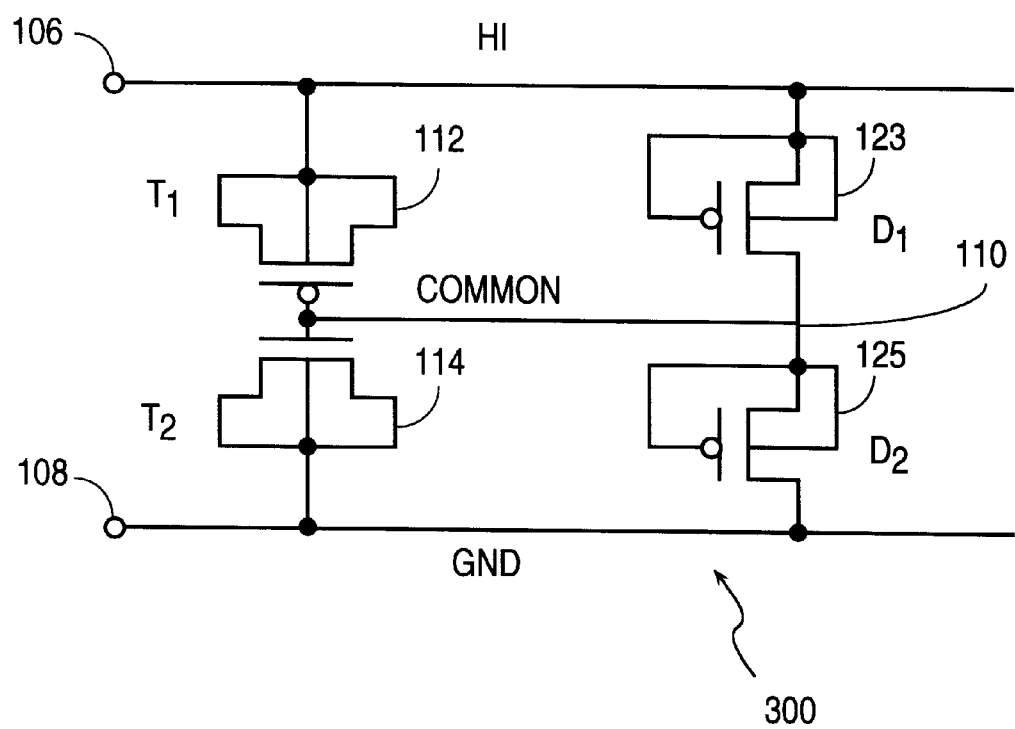
FIG. 3 illustrates a second alternative embodiment of the de-coupling circuit according to the present invention.

FIG. 3 illustrates an alternative embodiment 300 of the de-coupling circuit according to the present invention. In this embodiment, diodes 123 and 125 are implemented by way of matched PMOSFET transistors 123 and 125 that are diode-connected. The combination of these transistors maintain the node 110 at approximately one-half the voltage difference between the voltages at terminals 106 and 108. These transistors have high impedances as their gate nodes are connected in a fashion that ensures that $V_{GS}$, the gate-to-source Voltage is $\emptyset$ (zero) volts, ensuring that the channels of these transistors are turned off. The sub-threshold conduction in devices 123 and 125 emulates the behavior of high value resistances. Transistors 112 and 114 form the de-coupling divided capacitor.

Figure 4:
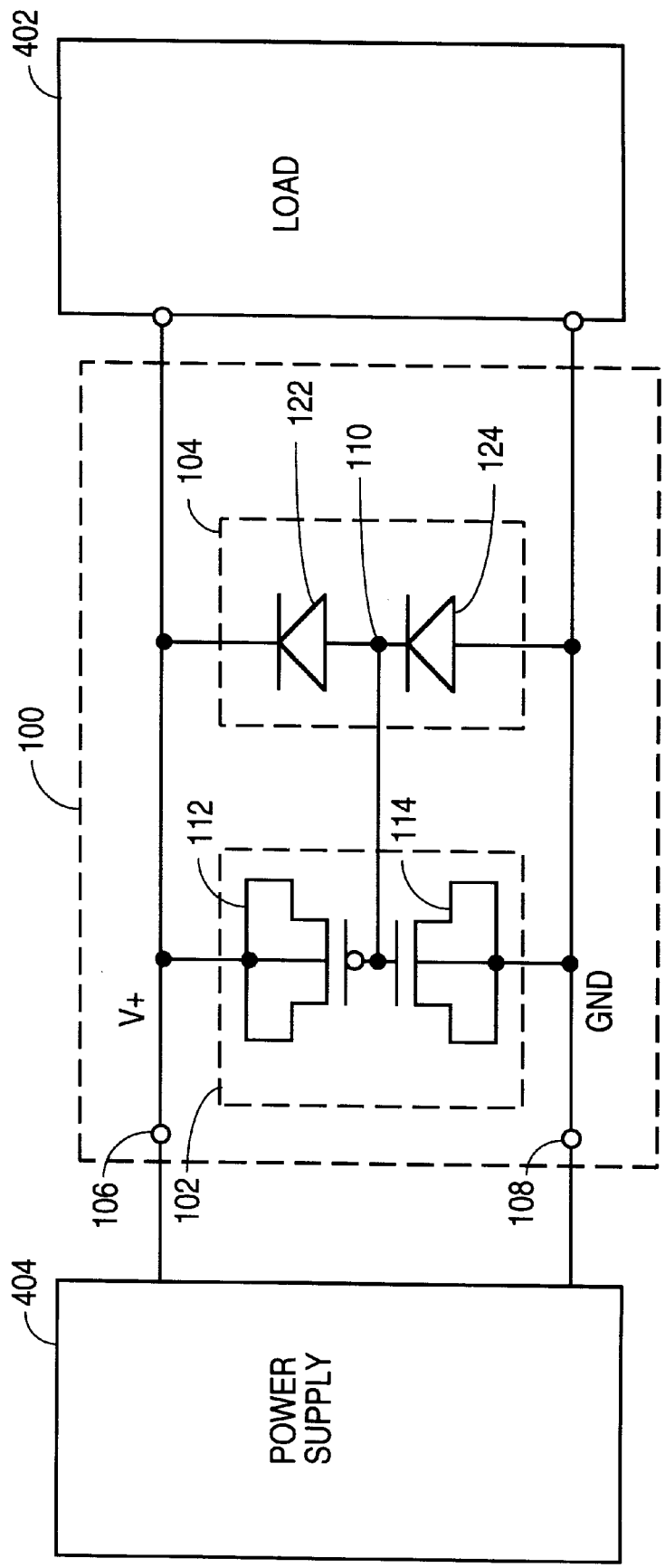
FIG. 4 illustrates a circuit utilizing a de-coupling circuit according to the present invention.

FIG. 4 illustrates a block diagram 400 of a load circuit 402 that is coupled to a power supply 404 and to a de-coupling circuit 100 according to the present invention.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. In an integrated circuit, a de-coupling circuit comprising:
   a voltage divider including first and second divider elements coupled to positive and negative supply voltages respectively, said first and second divider elements coupled therebetween at a node; and
   a p-channel Metal Oxide Semiconductor Field Effect Transistor (PMOSFET) and an n-channel Metal Oxide Semiconductor Field Effect Transistor (NMOSFET) that have their gates coupled at said node, said PMOSFETs and NMOSFETs have sources, drains, and bulks thereof coupled to said positive and negative supply voltages respectively,
   wherein said decoupling circuit is formed on a single integrated circuit substrate, and
   wherein said first and second elements include first and second diode-connected transistors respectively, coupled between said positive and negative supply voltages and adapted to operate in a sub-threshold conduction configuration.

2. The decoupling circuit of claim 1, wherein said voltage divider maintains said node at approximately half voltage difference between said first and second supply voltages.

3. The decoupling circuit of claim 1, wherein said PMOSFETs and NMOSFETs have substantially the same gate oxide geometry and area.

4. In an integrated circuit, a de-coupling circuit comprising:
   a voltage divider including first and second divider elements coupled to positive and negative supply voltages respectively, said first and second divider elements coupled therebetween at a node; and
   a p-channel Metal Oxide Semiconductor Field Effect Transistor (PMOSFET) and an n-channel Metal Oxide Semiconductor Field Effect Transistor (NMOSFET) that have their gates coupled at said node, said PMOSFETs and NMOSFETs have sources, drains, and bulks thereof coupled to said positive and negative supply voltages respectively,
   wherein said decoupling circuit is formed on a single integrated circuit substrate, and
   wherein said first and second elements include first and second diode-connected p-type MOSFET transistors coupled between said positive and negative supply voltages.

5. The decoupling circuit of claim 4, wherein said first and second diode-connected p-type MOSFET transistors are substantially matched.

6. The decoupling circuit of claim 4, wherein said voltage divider maintains said node at approximately half voltage difference between said first and second supply voltages.

7. The decoupling circuit of claim 4, wherein said PMOSFETs and NMOSFETs have substantially the same gate oxide geometry and area.

8. In an integrated circuit, a de-coupling circuit comprising:
   a voltage divider including first and second elements coupled to positive and negative supply voltages respectively, said first and second elements coupled therebetween at a node; and
   first and second p-channel Metal Oxide Semiconductor Field Effect Transistors (PMOSFETs) said first PMOSFET having a gate thereof coupled to said node and a drain, source, and bulk thereof coupled to said positive supply voltage, said second PMOSFET having a source, drain, and bulk thereof coupled to said node and said gate thereof coupled to said negative supply voltage,
   wherein the decoupling circuit is formed on a single integrated circuit substrate, and wherein said first and second elements include first and second diode-connected p-type MOSFET transistors coupled between said positive and negative supply voltages.

9. The decoupling circuit of claim 8, wherein said first and second diode-connected p-type MOSFET transistors are substantially matched.

10. The decoupling circuit of claim 8, wherein said voltage divider maintains said node at approximately half voltage difference between said first and second supply voltages.

11. The decoupling circuit of claim 8, wherein said PMOSFETs and NMOSFETs have substantially the same gate oxide geometry and area.

12. In an integrated circuit, a decoupling circuit comprising:
 a voltage divider including first and second elements coupled to positive and negative supply voltages respectively, said first and second elements coupled therebetween at a node; and
 first and second p-channel Metal Oxide Semiconductor Field Effect Transistors (PMOSFETs) said first PMOSFET having a gate thereof coupled to said node and a drain, source, and bulk thereof coupled to said positive supply voltage, said second PMOSFET having a source, drain, and bulk thereof coupled to said node and said gate thereof coupled to said negative supply voltage,
 wherein the decoupling circuit is formed on a single integrated circuit substrate,
 wherein said first and second elements include first and second diode-connected transistors respectively, coupled between said positive and negative supply voltages and adapted to operate in a sub-threshold conduction configuration.

13. The decoupling circuit of claim 12, wherein said voltage divider maintains said node at approximately half voltage difference between said first and second supply voltages.

14. The decoupling circuit of claim 12, wherein said PMOSFETs and NMOSFETs have substantially the same gate oxide geometry and area.

15. In a system having an integrated circuit that includes a power supply and a load circuit, a decoupling circuit is coupled to the power supply and the load circuit, the decoupling circuit comprising:
 a voltage divider including first and second divider elements coupled to positive and negative supply voltages respectively, said first and second divider elements coupled therebetween at a node, and
 a p-channel Metal Oxide Semiconductor Field Effect Transistor (PMOSFET) and an n-channel Metal Oxide Semiconductor Field Effect Transistor (NMOSFET) that have their gates coupled at said node, said PMOSFETs and NMOSFETs have sources, drains, and bulks thereof coupled to said positive and negative supply voltages respectively,
 wherein the decoupling circuit is formed on a single integrated circuit substrate,
 wherein said first and second elements include first and second diode-connected p-type MOSFET transistors coupled between said positive and negative supply voltages.

16. The decoupling circuit of claim 15, wherein said first and second diode-connected p-type MOSFET transistors are substantially matched.

17. The decoupling circuit of claim 15, wherein said voltage divider maintains said node at approximately half voltage difference between said first and second supply voltages.

18. The decoupling circuit of claim 15, wherein said PMOSFETs and NMOSFETs have substantially the same gate oxide geometry and area.

19. The decoupling circuit of claim 18, a capacitance of a configuration including said PMOSFET and NMOSFET has a value approximately equal to half a capacitance of said gate oxide area.

20. In a system having an integrated circuit that includes a power supply and a load circuit, a de-coupling circuit is coupled to the power supply and the load circuit, the decoupling circuit comprising:
 a voltage divider including first and second divider elements coupled to positive and negative supply voltages respectively, said first and second divider elements coupled therebetween at a node, and
 a p-channel Metal Oxide Semiconductor Field Effect Transistor (PMOSFET) and an n-channel Metal Oxide Semiconductor Field Effect Transistor (NMOSFET) that have their gates coupled at said node, said PMOSFETs and NMOSFETs have sources, drains, and bulks thereof coupled to said positive and negative supply voltages respectively,
 wherein the decoupling circuit is formed on a single integrated circuit substrate,
 wherein said first and second elements include first and second diode-connected transistors respectively, coupled between said positive and negative supply voltages and adapted to operate in a sub-threshold conduction configuration.

21. The decoupling circuit of claim 20, wherein said voltage divider maintains said node at approximately half voltage difference between said first and second supply voltages.

22. The decoupling circuit of claim 20, wherein said PMOSFETs and NMOSFETs have substantially the same gate oxide geometry and area.

* * * * *